Dec. 2, 1941.    A. PORTUGAELS    2,264,711
VIBRATING MACHINE

Filed April 26, 1938    3 Sheets-Sheet 1

Inventor.
Alfred Portugaels.
per.
Attorney.

Dec. 2, 1941.  A. PORTUGAELS  2,264,711
VIBRATING MACHINE
Filed April 26, 1938   3 Sheets-Sheet 2

Inventor.
Alfred Portugaels.
per. Severn
Attorney.

Dec. 2, 1941.     A. PORTUGAELS     2,264,711
VIBRATING MACHINE
Filed April 26, 1938      3 Sheets-Sheet 3
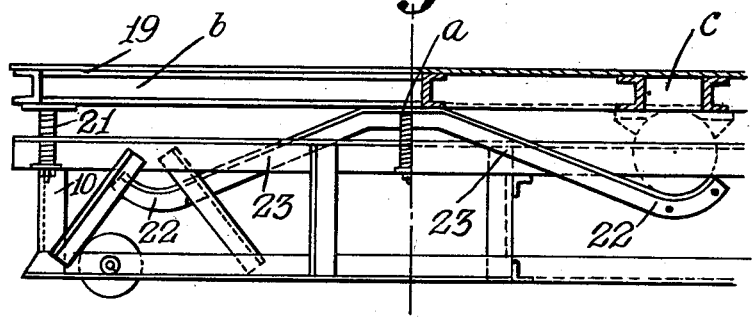
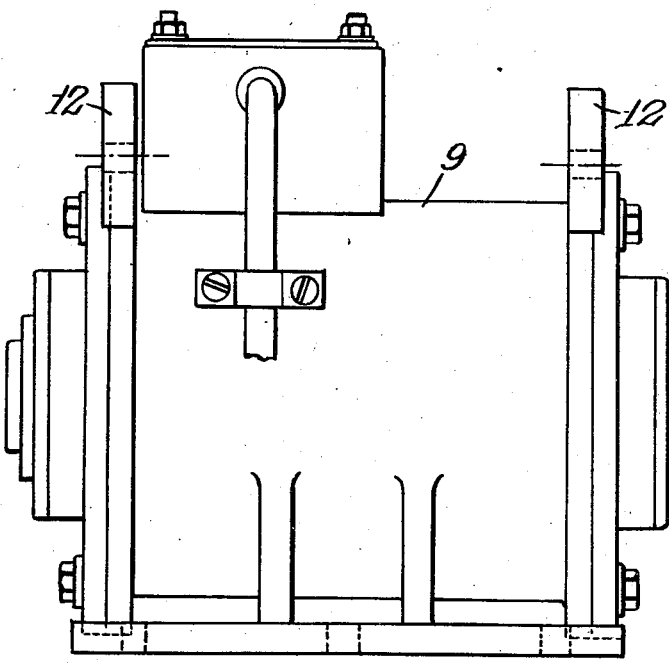
Inventor.
Alfred Portugaels.
per J. Gavern
Attorney.

Patented Dec. 2, 1941

2,264,711

UNITED STATES PATENT OFFICE 2,264,711

VIBRATING MACHINE

Alfred Portugaels, Ixelles, Belgium, assignor to "Vibramat" Société Anonyme, Brussels, Belgium Application April 26, 1938, Serial No. 204,276
In Belgium July 12, 1937

5 Claims. (Cl. 209—326)

The present invention relates to vibrating machine, such as vibrating screens, vibrating sieves, vibrating conveyers, vibrating tables for concrete tamping and the like.

It is known that it is useful to impart to such machine sinusoidal vibration. This vibrating movement is, indeed, that which is the most convenient for tamping concrete, sifting and the like.

It has been proposed to fix at least one vibrator upon a vibrating machine in the form of an eccentrically loaded pulley mounted in a frame bolted to the machine or an electric motor of the type designated as "vibro-motor" or "vibrating motor," which means a motor having an unbalanced rotor. The rotation of this motor should theoretically communicate to the frame an ideal sinusoidal vibration. In practice, this is not the case, and the screens or tables, instead of being subjected to sinusoidal vibration, are merely shaked in an irregular manner.

Moreover, the supporting foundations want to support strong reactions and must be very solid. Finally, the metal parts for example the metallic gauzes and motor windings (when use is made of a vibrating motor) and even the metal frames of the vibrating machines are often broken under the effect of local crystallizations in the metal. Therefore, the machines require the use of an expensive steel and only motors of relatively small power.

According to the invention, the vibrator is now fixed to the vibrating machine by at least two of its points lying at a different level with respect to the plane of the screen, sieve, conveyer, table or the like vibrating element. This arrangement eliminates the disturbing or parasitic vibrations.

When use is made, as a source of vibration of a motor with an unbalanced rotor, the motor will be rigidly connected to the machine frame, both at the base and at the upper part.

The invention also consists in a method of suspension of the frame upon the supporting structure with interposition of spring devices.

Further details of the invention will be described hereafter with reference to the accompanying drawings, which indicate by way of non-limitative examples, different forms of embodiment of the invention.

Figure 5 is a side elevation of a machine for vibrating concrete.

Figure 6 is a side view of a vibro-motor.

Figure 1 illustrates a vibrating screen 2 mounted on a frame 3. This screen is supported by a series of U-section girders, the U being closed at the lower side (see also Fig. 4).

The edge of the gauzes is clamped in a metallic sheet 5 having several folds, and is clamped in its curved part 6 by an adjustable tie 7.

The U-shaped elements 4 are arranged according to a parabolic curve, in such a manner that the screen remains always perfectly pressed against the transverse girders during the vibration.

Figure 4:
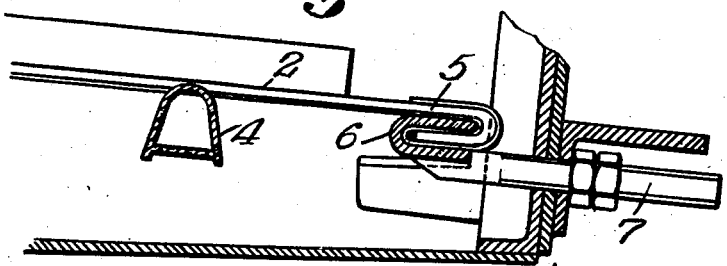
Figure 4 illustrates details for fixing the vibrating gauze.

Upon the frame 3 is mounted the vibrator 9. In the drawings, this vibrator is constituted by an electric motor (see Fig. 6). The use of an electric vibro-motor presents as an advantage compared with eccentrically loaded pulleys, the elimination of transmission belts which are capable of generating parasitic vibrating waves. This motor is fixed by its base a to a transverse member 10, formed by two I-girders, fixed upon the frame 3; the top of the motor is arranged in a cradle constituted by means of ties 11 connected to the frame. The connection of the motor to these ties is secured by means of flanges 12 (Fig. 4) which may be made integral with the motor casing. The end of each tie is fixed at b, c to the vibrating frame. Preferably, the connecting points a, b, c will be in alinement and arranged so as to divide the frame in equal parts. The base a will be in the middle of the frame, connection b at half distance between the base a and the edge d, and connection e at half distance between the base a and the edge e of the frame.

By connecting the motor to the frame both at the base and at the top, the travel of the vibrations is regularized and the quality of work is improved in sifting, screening, compacting and the like. If, moreover, the motor or the whole driving device is fixed at three separated points to the screen, the harm of local crystallizations of the metal and the reactions on the foundation are reduced, mainly when the connection points a, b, c divide the screen in four equal parts, as mentioned herebefore.

These phenomena may be explained as follows:

When a vibrating motor rapidly running is fixed by its base only, it is probable that, owing to the phenomena of elasticity and inertia of the material, the upper part (top of the motor) will not vibrate in the same way as the base fixed to the frame. These vibrations are transmitted to the frame through the motor and will probably be irregular, which will give rise to irregular vibrating waves, the travel of which will be much different from the ideal sinusoidal vibration.

When two particularly strong vibrating waves interfere with each other, the metal particles present at the interference points, will be subjected to excessive strains. This explains the local crystallizations and the untimely wearing out of the material. By fixing the motor to the frame in three points a, b, c, arranged as described hereinbefore, the interferences will be eliminated or considerably decreased, which eliminates the causes of breakage and crystallization of the material.

It must be understood that the single motor may be replaced by a set of motors and in this case, this set will be fixed to the frame in three points. In the example illustrated in Fig. 5, a set of two motors is provided. This set is fixed to the frame at points a, b, c.

It is also to be understood that use can be made of a plurality of motors or a plurality of groups of motors. In this way, instead of arranging the motor or an assemblage of motors according to the middle line of the frame, provision could be made of two sets of motors arranged each along the edge.

The motor or the assemblage of motors could be fixed to the frame in any number of points (n—1), of the latter, n being a whole number at least equal to 3, dividing the frame in n equal parts.

The frame 3 is supported by a structure 13, by means of the spring elements 14, the one pair being fixed on the structure and the other on a circular quadrant 13a, easily permitting the inclination of the frame to be adjusted. These elements (see also Fig. 3) are constituted by a ring 15, to which are fixed the springs 16 in radial arrangement. These springs are connected to a plate 17 in which is engaged the axis 18 fixed to the frame.

Figure 1:
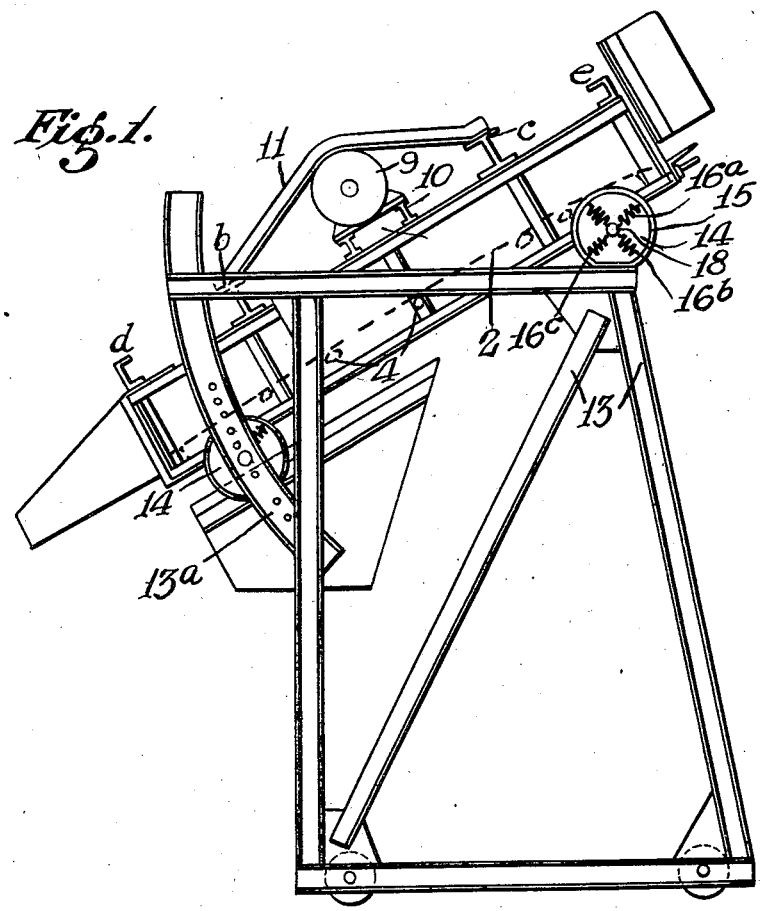
Figure 1 is a side elevation of a vibrating screen according to the invention.
Figure 2:
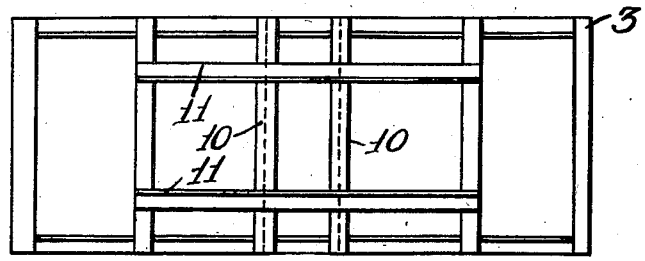
Figure 2 is a plan view of this screen.
Figure 3:
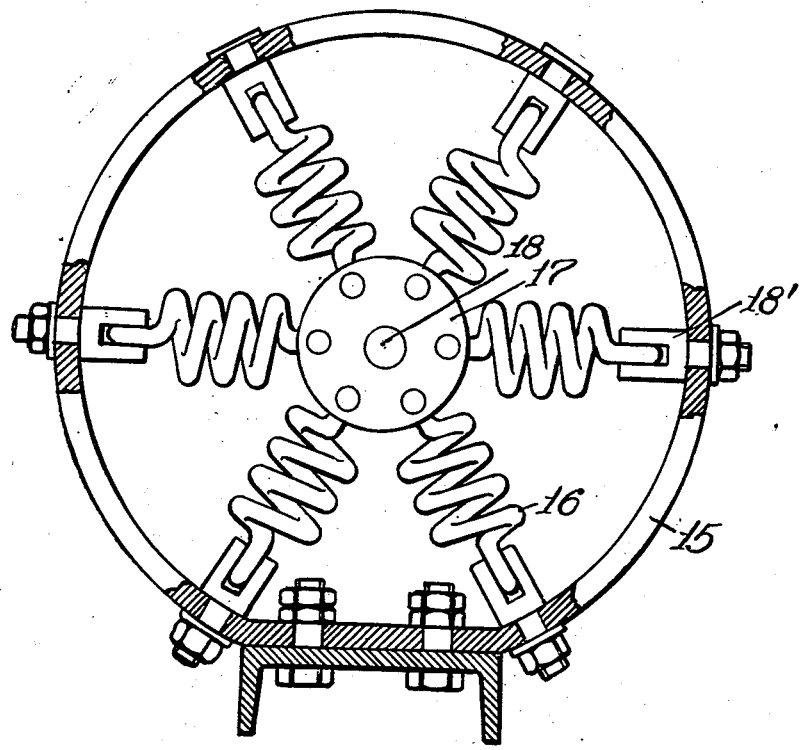
Figure 3 illustrates a spring element used in this construction.

The springs will be in even number and symmetrically arranged in such a manner that each time, when a spring acts by compression, an opposite compensating spring acts under traction and vice-versa. Figure 3 illustrates a ring with six springs and Figure 1 a ring with four springs.

The springs, such as 16a, 16b, the axis of which is less inclined upon the vertical, ought not only to resist to the strains generated by the vibration, but also to support the main portion of the weight of the frame. It will thus be useful to provide in these springs a wire section greater than for the other springs, mainly in plants comprising a heavy material.

It may be useful that the coils of the upper springs 16a, 16a' are more compact than the coils of the springs 16b, 16b', in such a manner that, when the apparatus is stopped, the weight of the latter compressing the lower springs 16b, 16b' and tensioning the springs 16a, 16a', the pitch of the different springs should be substantially the same. Finally, a regulating device 18' comprising a stirrup with threaded spindle and a nut is provided for regulating the tension of each spring.

The vibrating table 19 of Fig. 5 is used for the production of cast pieces in concrete. This table is supported by a frame 20, with interposition of sets of opposite springs, such as 21. The vibrations are produced by the use of two vibromotors, such as illustrated in Figure 6, and which are arranged in two cradles 22 provided at the ends of the supporting ties 23. The frame can be directly mounted on wheels, so that any foundation is completely eliminated. This arrangement is advantageous namely in work-yards where the vibrating table ought to be movable.

The invention is not restricted to the forms of embodiment described by way of example, but it extends to all vibrating machines within the scope of the following claims.

I claim:

1. In a vibrating machine comprising a base, a vibrating frame, resilient means supporting said frame on said base in such a manner as to permit universal movement in a plane extending longitudinally of said frame, means for vibrating said frame comprising an electric motor having an eccentrically loaded element, said motor being mounted on said frame and having its base secured to said frame approximately midway between the ends of said frame; the combination therewith of ties extending longitudinally of said frame and connected at their midpoints to the top of said motor, the ends of said ties being connected to the frame at points substantially midway between the ends of said frame and the base on said motor.

2. In a vibrating machine comprising a base, a vibrating frame, resilient means supporting said frame on said base in such a manner as to permit universal movement in a plane extending longitudinally of said frame and means for vibrating said frame, said means comprising an electric motor having an unbalanced rotor extending transversely of said frame, said motor being mounted on said frame and having its base secured to said frame at a point intermediate between the ends of said frame; the combination therewith of ties extending longitudinally of said frame and connected at intermediate points to the top of said motor, the ends of said ties being connected to the frame at points substantially mid-way between the ends of said frame and the base of said motor.

3. In a vibrating machine comprising a base, a vibrating frame, resilient means supporting said frame on said base in such a manner as to permit universal movement in a plane extending longitudinally of said frame, means for vibrating said frame, said means comprising an electric motor solely supported on said frame and having an unbalanced rotor extending transversely of said frame, said motor being mounted on said frame and having its base secured to said frame approximately midway between the ends of said frame; the combination therewith of ties extending longitudinally of said frame and connected at their midpoints to the top of said motor, the ends of said ties being connected to the frame at points substantially midway between the ends of the frame and the base of the motor.

4. In a vibrating machine comprising a base, a vibrating frame, spring boxes for connecting said frame with said base, said boxes consisting of studs projecting from said frame, casings secured to said base and springs radially arranged between said studs and said casings, means for vibrating said frame, said means comprising an electric motor solely supported on said frame and having an unbalanced rotor extending transversely of said frame, said motor being mounted on said frame and having its base secured to said frame approximately midway between the ends of said frame; the combination therewith of ties extending longitudinally of said frame and connected at their midpoints to the top of said motor, the ends of said ties being connected to the frame at points substantially midway between the ends of the frame and the base of the motor.

5. In a vibrating machine comprising a base, a vibrating frame, spring boxes for connecting said frame with said base, said boxes consisting of studs projecting from said frame, casings secured to said base and springs radially arranged between said studs and said casings, means for vibrating said frame comprising an electric motor having an eccentrically loaded element, said motor being mounted on said frame and having its base secured to said frame approximately midway between the ends of said frame; the combination therewith of ties extending longitudinally of said frame and connected at their midpoints to the top of said motor, the ends of said ties being connected to the frame at points substantially midway between the ends of said frame and the base of said vibrating element.

ALFRED PORTUGAELS.